United States Patent
Pedersen et al.

(10) Patent No.: US 8,447,345 B2
(45) Date of Patent: *May 21, 2013

(54) UPLINK POWER CONTROL FOR MULTIPLE COMPONENT CARRIERS

(75) Inventors: Klaus I. Pedersen, Aalborg (DK); Claudio Rosa, Randers (DK)

(73) Assignee: Nokia Siemens Networks Oy, Espoo (FI)

(*) Notice: Subject to any disclaimer, the term of this patent is extended or adjusted under 35 U.S.C. 154(b) by 0 days.

This patent is subject to a terminal disclaimer.

(21) Appl. No.: 13/489,870

(22) Filed: Jun. 6, 2012

(65) Prior Publication Data

US 2012/0314666 A1 Dec. 13, 2012

Related U.S. Application Data

(63) Continuation of application No. 12/699,146, filed on Feb. 3, 2010, now Pat. No. 8,224,372.

(60) Provisional application No. 61/206,807, filed on Feb. 3, 2009, provisional application No. 61/210,337, filed on Mar. 17, 2009.

(51) Int. Cl.
*H04W 52/04* (2009.01)
*H04B 7/00* (2006.01)

(52) U.S. Cl.
USPC ........... 455/522; 455/69; 455/127.1; 455/126

(58) Field of Classification Search
USPC .................. 455/522, 69, 127.1, 126, 423, 59, 455/67.11, 515, 115.1, 115.3, 551; 370/335, 370/342, 330
See application file for complete search history.

(56) References Cited

U.S. PATENT DOCUMENTS

| 6,477,388 B1 | 11/2002 | Schmutz ................ 455/522 |
| 2005/0135312 A1* | 6/2005 | Montojo et al. ............ 370/335 |
| 2010/0215017 A1* | 8/2010 | Li et al. .................... 370/330 |

FOREIGN PATENT DOCUMENTS

| EP | 1 793 509 A1 | 6/2007 |
| WO | WO-2009/003330 A1 | 1/2009 |

OTHER PUBLICATIONS

3GPP TS 36.300, V8.7.0 (Dec. 2008), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description: Stage 2 (Release 8).

3GPP TR 36.913, V8.0.0 (Jun. 2008), 3rd Generation Partnership Project; Technical Specification Group Radio Access Network; Requirements for Further Advancements for E-UTRA (LTE-Advanced) (Release 8).

(Continued)

*Primary Examiner* — John J Lee
(74) *Attorney, Agent, or Firm* — Harrington & Smith

(57) ABSTRACT

A first method includes determining if a sum of the transmit powers of individual component carriers is less than a maximum user equipment transmit power, adjusting the transmit power of one or more of the component carriers if the sum of the transmit powers of the individual component carriers is not less than the maximum user equipment transmit power, and transmitting the component carriers to a network access node. A second method includes identifying a component carrier with minimum transmit power and a component carrier with a maximum transmit power, calculating a power difference, determining if the power difference is greater than a predetermined maximum power difference and, if it is, increasing the transmit power of the component carrier with minimum transmit power by a first amount and decreasing the transmit power of the component carrier with the maximum transmit power by a second amount.

17 Claims, 6 Drawing Sheets

OTHER PUBLICATIONS

3GPP TR 36.814 V0.3.0 ((Jan. 2009), $3^{rd}$ Generation Partnership Project; Technical Specification Group Radio Access Network; Further Advancements for E-UTRA Physical Layer Aspects (Release X).

3GPP TS 36.213 V8.5.0 (Dec. 2008), $3^{rd}$ Generation Partnership Project; Technical Specification Group Radio Access Network; Evolved Universal Terrestrial Radio Access (E-UTRA); Physical layer procedures (Release 8).

3GPP TSG RAN WG1 #54 Meeting, "Autonomous component carrier selection for LTE-Advanced", Nokia Siemens Networks, Nokia; Jeju Island, Korea, Aug. 18-22, 2008; R1-083103.

3GPP TSG RAN WG1 #55 Meeting, "Algorithms and results for autonomous component carrier selection for LTE-Advanced", Nokia Siemens Networks, Nokia; Prague, Czech Republic, Nov. 10-14, 2008; R1-084321.

3GPP TSG RAN WG1 #55-bis Meeting, "Use of Background Interference Matrix for Autonomous Component Carrier Selection for LTE-Advanced", Nokia Siemens Networks, Nokia; Ljubljana, Slovenia, Jan. 12-16, 2009; R1-090235.

3GPP TSG RAN WG1 #55bis, "Notion of Anchor Carrier in LTE-A", Qualcomm Europe, Ljubljana, Slovenia, Jan. 12-16, 2009; R1-090356.

* cited by examiner

UPLINK POWER CONTROL FOR MULTIPLE COMPONENT CARRIERS

CROSS-REFERENCE TO RELATED APPLICATIONS

The present application is a continuation of Ser. No. 12/699,146, filed on Feb. 3, 2010, now U.S. Pat. No. 8,224,372 which claims the benefit under 35 U.S.C. §119(e) of U.S. Provisional Patent Applications No. 61/206,807, filed on Feb. 3, 2009, and 61/210,337, filed on Mar. 17, 2009, the disclosures of which are hereby incorporated by reference in their entirety.

TECHNICAL FIELD

The exemplary and non-limiting embodiments of this invention relate generally to wireless communication systems, methods, devices and computer programs and, more specifically, relate to uplink transmission power control methods, apparatus and computer programs.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
BCH broadcast channel
CC component carrier
CDM code division multiplexing
DL downlink (eNB towards UE)
eNB EUTRAN Node B (evolved Node B)
EPC evolved packet core
EUTRAN evolved UTRAN (LTE)
FDD frequency division duplex
FDMA frequency division multiple access
HARQ hybrid automatic repeat request
LTE long term evolution
MAC medium access control
MM/MME mobility management/mobility management entity
Node B base station
OFDMA orthogonal frequency division multiple access
OLPC open loop power control
O&M operations and maintenance
PC power control
PDCCH physical downlink control channel
PDCP packet data convergence protocol
PDU protocol data unit
PHY physical layer (layer 1)
PRB physical resource block
PSD power spectral density
PUCCH physical uplink control channel
PUSCH physical uplink shared channel
RLC radio link control
RRC radio resource control
RSRP reference signal received power
SGW serving gateway
SC-FDMA single carrier, frequency division multiple access
TPC transmit power control
Tx transmit
UE user equipment
UL uplink (UE towards eNB)
UTRAN universal terrestrial radio access network The specification of a communication system known as evolved UTRAN (EUTRAN, also referred to as UTRAN-LTE or as EUTRA) is currently nearing completion within the 3GPP. As specified the DL access technique is OFDMA, and the UL access technique is SC-FDMA.

One specification of interest is 3GPP TS 36.300, V8.7.0 (2008-12), 3rd Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 8). This system may be referred to for convenience as LTE Rel-8, or simply as Rel-8. In general, the set of specifications given generally as 3GPP TS 36.xyz (e.g., 36.211, 36.213, 36.312, etc.) may be seen as describing the entire Release 8 LTE system.

FIG. 1 reproduces FIG. 4.1 of 3GPP TS 36.300, and shows the overall architecture of the EUTRAN system. The EUTRAN system includes eNBs, providing the EUTRA user plane (PDCP/RLC/MAC/PHY) and control plane (RRC) protocol terminations towards the UE. The eNBs are interconnected with each other by means of an X2 interface. The eNBs are also connected by means of an S1 interface to an EPC, more specifically to a MME (Mobility Management Entity) by means of an S1 MME interface and to a Serving Gateway (SGW) by means of an S1 interface. The S1 interface supports a many to many relationship between MMEs/Serving Gateways and eNBs.

The eNB hosts the following functions:

functions for Radio Resource Management: Radio Bearer Control, Radio Admission Control, Connection Mobility Control, Dynamic allocation of resources to UEs in both uplink and downlink (scheduling);

IP header compression and encryption of the user data stream;

selection of a MME at UE attachment;

routing of User Plane data towards Serving Gateway;

scheduling and transmission of paging messages (originated from the MME);

scheduling and transmission of broadcast information (originated from the MME or O&M); and measurement and measurement reporting configurations to provide mobility and scheduling.

Of particular interest herein are the further releases of 3GPP LTE targeted towards future IMT-A systems, referred to herein for convenience simply as LTE-Advanced (LTE-A). Reference may be made to 3GPP TR 36.913, V8.0.0 (2008-06), 3rd Generation Partnership Project; Technical Specification Group Radio Access Network; Requirements for Further Advancements for E-UTRA (LTE-Advanced) (Release X). Reference may also be made to 3GPP TR 36.814, V0.3.0 (2009-01), 3rd Generation Partnership Project; Technical Specification Group Radio Access Network; Further Advancements for E-UTRA Physical Layer Aspects (Release X).

Another specification of interest is 3GPP TS 36.213, V8.5.0 (2008-12), 3rd Generation Partnership Project; Technical Specification Group Radio Access Network; Evolved Universal Terrestrial Radio Access (E-UTRA); Physical layer procedures (Release 8).

BRIEF SUMMARY

In a first aspect, a method is disclosed that includes determining if a sum of transmit powers of individual component carriers of a plurality of component carriers is less than a maximum user equipment transmit power. The method also includes adjusting, if needed, the transmit power of one or more of the plurality of component carriers if the sum of the transmit powers of the individual component carriers is not less than the maximum user equipment transmit power, and transmitting the component carriers to a network access node.

In another exemplary embodiment, an apparatus is disclosed that includes at least one processor and at least one memory including computer program code. The at least one memory and the computer program code are configured to, with the at least one processor, cause the apparatus to perform at least the following: determining if a sum of transmit powers of individual component carriers of a plurality of component carriers is less than a maximum user equipment transmit power; adjusting, if needed, the transmit power of one or more of the plurality of component carriers if the sum of the transmit powers of the individual component carriers is not less than the maximum user equipment transmit power; and transmitting the component carriers to a network access node.

In yet another exemplary embodiment, a computer program product is disclosed that includes a computer-readable medium bearing computer program code embodied therein for use with a computer, the computer program code comprising: code for determining if a sum of transmit powers of individual component carriers of a plurality of component carriers is less than a maximum user equipment transmit power; code for adjusting, if needed, the transmit power of one or more of the plurality of component carriers if the sum of the transmit powers of the individual component carriers is not less than the maximum user equipment transmit power; and code for causing the component carriers to be transmitted to a network access node.

In a second aspect of the invention, a method includes identifying a component carrier with minimum transmit power and a component carrier with a maximum transmit power and calculating a power difference as a difference between the maximum transmit power and the minimum transmit power. The method also includes determining if the power difference is greater than a predetermined maximum power difference and, if it is, increasing the transmit power of the component carrier with minimum transmit power by a first predetermined amount and decreasing the transmit power of the component carrier with the maximum power by a second predetermined amount. The method further includes, if there are more than two component carriers, repeating the identifying, calculating and determining until the power difference is less than the predetermined maximum power difference such that the maximum power difference between component carriers is constrained to be less than or equal to the predetermined maximum power difference.

In another exemplary embodiment, an apparatus is disclosed that includes at least one processor and at least one memory including computer program code. The at least one memory and the computer program code configured to, with the at least one processor, cause the apparatus to perform at least the following: identifying a component carrier with minimum transmit power and a component carrier with a maximum transmit power; calculating a power difference as a difference between the maximum transmit power and the minimum transmit power; determining if the power difference is greater than a predetermined maximum power difference and, if it is, increasing the transmit power of the component carrier with minimum transmit power by a first predetermined amount and decreasing the transmit power of the component carrier with the maximum power by a second predetermined amount; and if there are more than two component carriers, repeating the identifying, calculating and determining until the power difference is less than the predetermined maximum power difference such that the maximum power difference between component carriers is constrained to be less than or equal to the predetermined maximum power difference.

In a further exemplary embodiment, a computer program product is disclosed that includes a computer-readable medium bearing computer program code embodied therein for use with a computer, the computer program code comprising: code for identifying a component carrier with minimum transmit power and a component carrier with a maximum transmit power; code for calculating a power difference as a difference between the maximum transmit power and the minimum transmit power; code for determining if the power difference is greater than a predetermined maximum power difference and, if it is, increasing the transmit power of the component carrier with minimum transmit power by a first predetermined amount and decreasing the transmit power of the component carrier with the maximum power by a second predetermined amount; and code for if there are more than two component carriers, repeating the identifying, calculating and determining until the power difference is less than the predetermined maximum power difference such that the maximum power difference between component carriers is constrained to be less than or equal to the predetermined maximum power difference.

DETAILED DESCRIPTION

Figure 1:
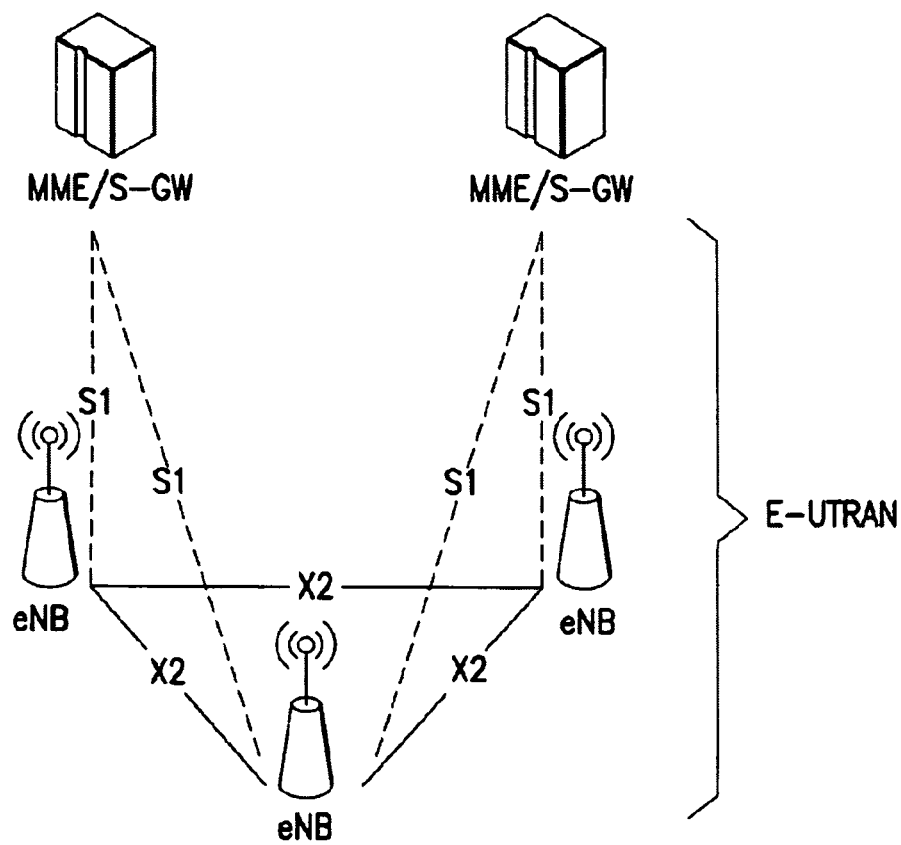
FIG. 1 reproduces FIG. 4.1 of 3GPP TS 36.300, and shows the overall architecture of the EUTRAN system.

The main scope of power control for the PUSCH in LTE-Advanced may be assumed to be similar to Rel-8, i.e., to compensate for channel conditions (e.g., distance-dependent path loss and shadowing) while reducing the interference generated towards neighboring cells. The PUSCH power control concept for LTE-Advanced may thus be expected to have certain similarities with the PUSCH power control standardized for Rel-8 LTE, i.e., open loop fractional power control (based on cell-specific as well as user-specific power control parameters) with the possibility for the eNB to transmit closed loop power control corrections on the PDCCH (together with UL scheduling grants).

In a first aspect of the invention, described herein is a novel generalized UL power control formula for, as one non-limiting application, LTE-Advanced with multiple component carriers. The Rel-8 power control formula is extended to multiple component carriers, and there is provided a mechanism for ensuring that the sum of the transmit powers on the individual component carriers is less than a maximum transmit power of the UE. At least two embodiments are described for guaranteeing that this requirement is always fulfilled.

In a second aspect of the invention, exemplary embodiments described herein may be used to control the maximum transmit power difference between the CCs, or to control the maximum PSD between the CCs.

In the Rel-8 LTE uplink the UE sets its transmission power on the PUSCH according to the following standardized power control formula (e.g., see sub-clause 5.1.1, "Physical uplink shared channel" of 3GPP TS 36.213):

$$P = \min\lfloor P_{MAX}, 10 \cdot \log_{10} M + P_{0\_PUSCH} + \alpha \cdot PL + \Delta_{MCS} + f(\Delta_i) \rfloor [dB] \qquad (1);$$

where, $P_{MAX}$ is the maximum UE power which depends on the UE class;

M is the number of allocated physical resource blocks (PRBs);

PL is the UE path loss derived at the UE based on RSRP measurement and signaled RS eNode-B transmission power;

$\Delta_{MCS}$ is an MCS-dependent power offset set by the eNB;

$P_{0\_PUSCH}$ is a UE-specific parameter (partially broadcasted and partially signaled using RRC);

$\alpha$ is cell-specific parameter (broadcast on the BCH);

$\Delta_i$ are closed loop PC commands signaled from the eNB to the UE; and the function $f()$ indicates whether closed loop commands are relative accumulative or absolute. $f()$ is signaled to the UE via higher (protocol) layers.

Compared to Rel-8, LTE-Advanced provides the possibility to introduce component carrier (CC) specific uplink power control. In general, CC-specific power control is expected to be needed for a case with non-contiguous channel aggregation due to potentially quite different propagation conditions on different CCs. On the other hand, CC-specific power control might also be needed with contiguous channel aggregation due to different interference conditions and/or requirements on different component carriers (e.g. depending on load conditions, autonomous component carrier selection, etc.).

General reference may be made to, for example, 3GPP Tdoc R1-083103, "Autonomous component carrier selection for LTE-Advanced", Nokia Siemens Networks, Nokia; 3GPP Tdoc R1-084321, "Algorithms and results for autonomous component carrier selection for LTE-Advanced", Nokia Siemens Networks, Nokia; and to 3GPP Tdoc R1-090235, "Use of Background Interference Matrix for Autonomous Component Carrier Selection for LTE-Advanced", Nokia Siemens Networks, Nokia.

The main idea of CC-specific power control is basically to define a similar power control formula for the PUSCH as the one standardized in Rel-8, but having certain open loop power control parameters which are specific on a component carrier basis.

When transmitting on one component carrier the UE may use a similar power control formula as in Eq. (1) above, where some of the power control parameters are component carrier specific:

$$P = \min\lfloor P_{MAX}, 10 \cdot \log_{10} M[k] + P_{0\_PUSCH}[k] + \alpha[k] \cdot PL[k] + \Delta_{MCS} + f(\Delta_i[k]) \rfloor [dB] \qquad (2);$$

where,

M[k] is the number of allocated PRBs on component carrier k,

PL[k] is the estimated path loss on component carrier k;

$P_{0\_PUSCH}[k]$ and $\alpha[k]$ are the component carrier specific open loop power control parameters; and $\Delta_i[k]$ is the closed loop PC command and is here assumed to be component carrier specific (although it is possible to have one UE-specific closed loop power control command).

Based on Equation (2), CC-specific PC involves defining CC-specific OLPC parameters (i.e., $P_{0\_PUSCH}[k]$ and $\alpha[k]$), while the necessity to introduce CC-specific path loss measurements depends on the type of channel aggregation. CC-specific path loss measurements are not necessary in the case of contiguous channel aggregation, while in the case of non-contiguous channel aggregation the path loss conditions may be quite different on different component carriers.

With regard to the first aspect, more specifically, CC-specific path loss measurements are generally not necessary in the case of contiguous channel aggregation (since the propagation conditions are expected to be the same for adjacent CCs). However, in case of non-contiguous channel aggregation the path loss, conditions may be significantly different on different component carriers. However, the UE may not be required to perform RSRP measurements on each component carrier for the purpose of estimating the path loss. Instead, the UE may perform measurements on a single CC ($K_P$) and derive the path loss for other component carriers using a CC-specific offset signalled from the network (the eNB may be assumed to have knowledge of the frequency separation between component carriers and of the corresponding difference in propagation conditions):

$$PL[k] = PL\lfloor K_P \rfloor + \Delta_{PL}[k] \qquad (3)$$

Referring to the proposed definitions in 3GPP Tdoc R1-083103, 3GPP Tdoc R1-084321, and 3GPP Tdoc R1-090235, as well as in 3GPP Tdoc R1-090356, "Notion of Anchor Carrier in LTE-A", Qualcomm Europe, the component carrier where the UE makes the path loss measurements may be restricted to the so-called primary or anchor CC.

With regard to the second aspect, it can be noted that $P_{MAX}$ in Equation (2) is the maximum transmit power per component carrier. However, the power control equation in Equation (2) does not include a mechanism for constraining the sum of the transmit powers on the different active component carriers to be less than the UE maximum power. Further, in those cases where the power control formula results in a total power greater than the UE maximum power, a mechanism for adjusting the power to fulfil this requirement is needed. The exemplary embodiments of the second aspect of the invention address and solve at least these two problems.

It can be noticed that the power control equation (2) can only be applied when the UE transmits on a single component carrier. However, care should be exercised when designing the power control scheme, as there exists a potential to induce large transmit power differences between the CCs depending on, for example, the CC-specific power control parameter settings. This condition is undesirable, as it may be considered problematic for the UE to operate with arbitrarily high transmit power differences between the CCs.

In the second aspect of the invention, the exemplary embodiments provide a method and apparatus to always control the maximum power difference between CCs to be less than, or equal to, P_diff_max decibels. The method and apparatus are needed at the UE, since the eNB is not able to fully control the power difference between CCs due to, for example, constraints related to signaling between the eNB and UE.

In the second aspect of the invention, the exemplary embodiments of this invention provide in at least one aspect thereof a method and apparatus to achieve LTE-Advanced uplink power control with multiple CCs that controls the maximum power imbalance between CCs. The Rel-8 power control formula is extended to multiple component carriers, and the method and apparatus operate to ensure that the power difference between CCs is constrained so as not to exceed a certain value. This is an important aspect of the exemplary embodiments of the second aspect of the invention, as it can be very challenging to design UEs that can operate with an arbitrary transmit power difference between different CCs. The method and apparatus are simple and may be readily implemented for, as one example, the LTE-Advanced standardization of uplink power control.

Figure 2A:
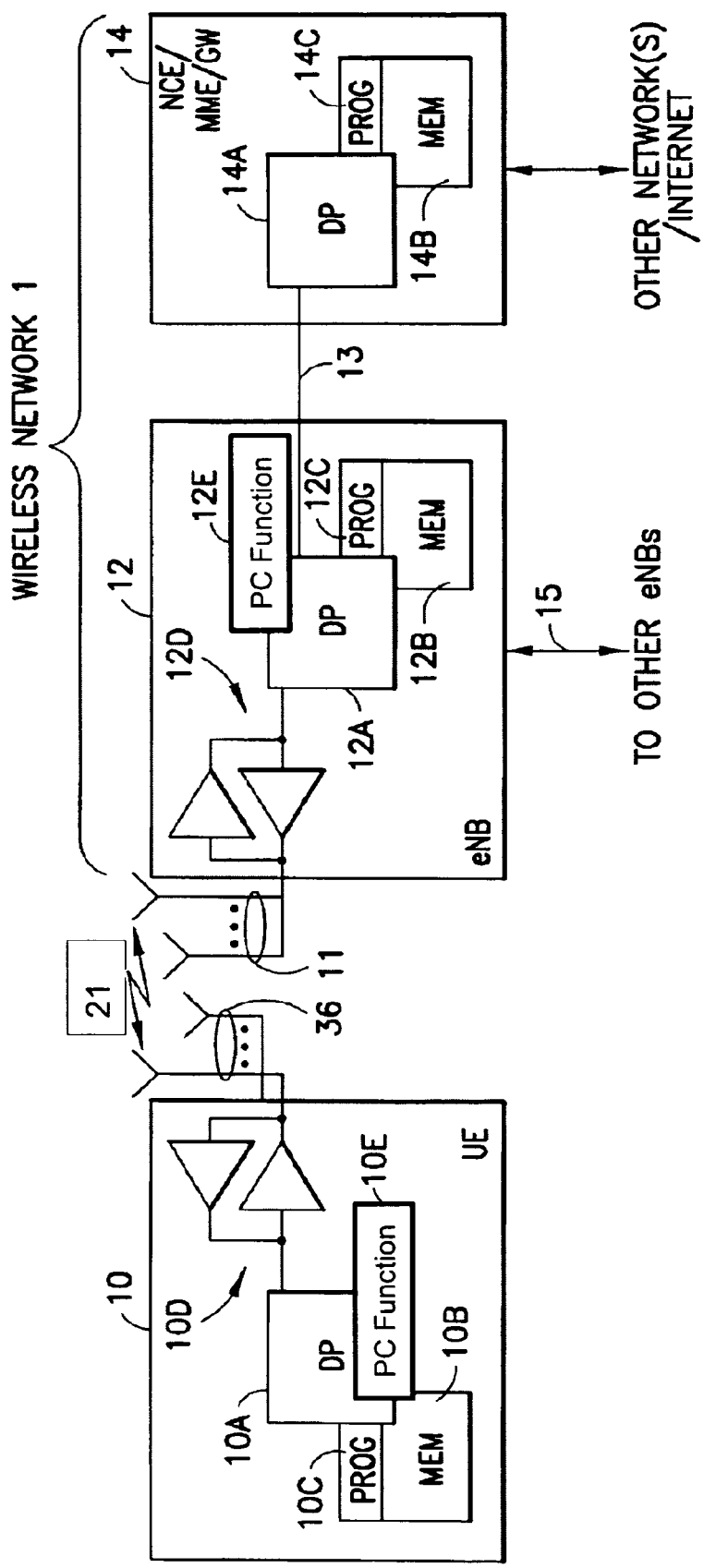
FIG. 2A shows a simplified block diagram of various electronic devices that are suitable for use in practicing the exemplary embodiments of this invention.

Before describing in further detail the exemplary embodiments of this invention, reference is made to FIG. 2A for illustrating a simplified block diagram of various electronic devices and apparatus that are suitable for use in practicing the exemplary embodiments of this invention. In FIG. 2A a wireless network 1 is adapted for communication over a wireless link 11 with an apparatus, such as a mobile communication device which may be referred to as a UE 10, via a network access node, such as a Node B (base station), and more specifically an eNB 12. The network 1 may include a network control element (NCE) 14 that may include the MME/SGW functionality shown in FIG. 1, and which provides connectivity with a further network, such as a telephone network and/or a data communications network (e.g., the internet). The UE 10 includes a controller, such as a computer or a data processor (DP) 10A, a computer-readable memory medium embodied as a memory (MEM) 10B that stores a program of computer instructions (PROG) 10C, and a suitable radio frequency (RF) transceiver 10D for bidirectional wireless communications with the eNB 12 via one or more antennas. The eNB 12 also includes a controller, such as a computer or a data processor (DP) 12A, a computer-readable memory medium embodied as a memory (MEM) 12B that stores a program of computer instructions (PROG) 12C, and a suitable RF transceiver 12D for communication with the UE 10 via one or more antennas. The eNB 12 is coupled via a data/control path 13 to the NCE 14. The path 13 may be implemented as the S1 interface shown in FIG. 1. The eNB 12 may also be coupled to another eNB via data/control path 15, which may be implemented as the X2 interface shown in FIG. 1. The NCE 14 also includes a controller, such as a computer or a data processor (DP) 14A, and a computer-readable memory medium embodied as a memory (MEM) 14B that stores a program of computer instructions (PROG) 14C.

For the purposes of describing the exemplary embodiments of this invention the UE 10 may be assumed to also include a power control (PC) functional block 10E, and the eNB 12 may also include a PC functional block 12E.

At least one of the PROGs 10C and 12C is assumed to include program instructions that, when executed by the associated DP, enable the device to operate in accordance with the exemplary embodiments of this invention, as will be discussed below in greater detail. That is, the exemplary embodiments of this invention may be implemented at least in part by computer software executable by the DP 10A of the UE 10 and/or by the DP 12A of the eNB 12, or by hardware, or by a combination of software and hardware (and firmware).

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on multi-core processor architectures, as non-limiting examples.

Figure 2B:
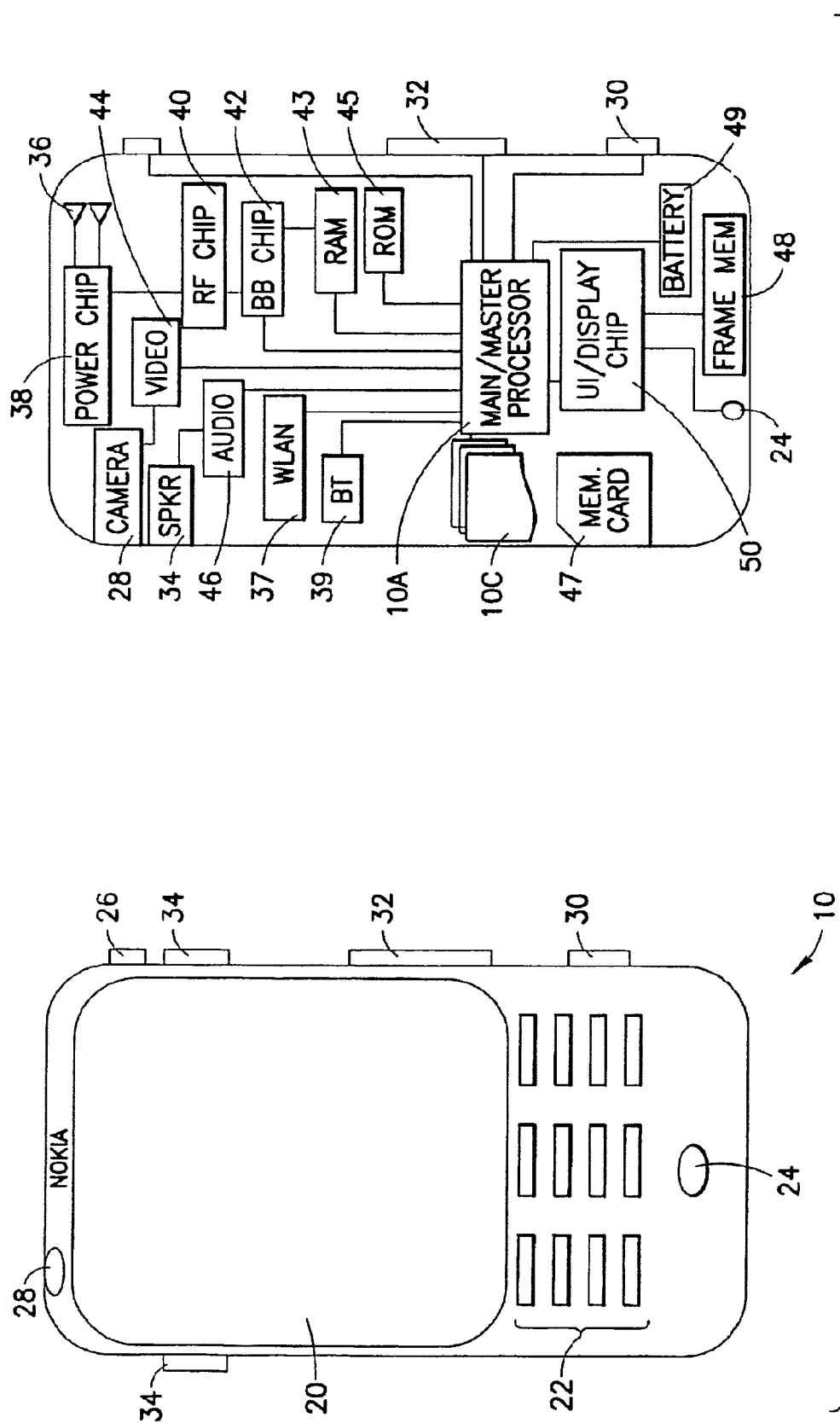
FIG. 2B shows a more particularized block diagram of a user equipment such as that shown at FIG. 2A.

FIG. 2B illustrates further detail of an exemplary UE 10 in both plan view (left) and sectional view (right), and the invention may be embodied in one or some combination of those more function specific components. At FIG. 2B the UE 10 has a graphical display interface 20 and a user interface 22 illustrated as a keypad but understood as also encompassing touch screen technology at the graphical display interface 20 and voice recognition technology received at the microphone 24. A power actuator 26 controls the device being turned on and off by the user. The exemplary UE 10 may have a camera 28 which is shown as being forward facing (e.g., for video calls) but may alternatively or additionally be rearward facing (e.g., for capturing images and video for local storage). The camera 28 is controlled by a shutter actuator 30 and optionally by a zoom actuator 32 which may alternatively function as a volume adjustment for the speaker(s) 34 when the camera 28 is not in an active mode.

Within the sectional view of FIG. 2B are seen multiple transmit/receive antennas 36 that are typically used for cellular communication. The antennas 36 may be multi-band for use with other radios in the UE. The operable ground plane for the antennas 36 is shown by shading as spanning the entire space enclosed by the UE housing though in some embodiments the ground plane may be limited to a smaller area, such as disposed on a printed wiring board on which the power chip 38 is formed. The power chip 38 controls power amplification on the channels being transmitted and/or across the antennas that transmit simultaneously where spatial diversity is used, and amplifies the received signals. The power chip 38 outputs the amplified received signal to the radio frequency (RF) chip 40 which demodulates and downconverts the signal for baseband processing. The baseband (BB) chip 42 detects the signal which is then converted to a bit stream and finally decoded. Similar processing occurs in reverse for signals generated in the apparatus 10 and transmitted from it.

Signals going to and from the camera 28 may pass through an image/video processor 44 that encodes and decodes the various image frames. A separate audio processor 46 may also be present controlling signals to and from the speakers 34 and the microphone 24. The graphical display interface 20 is refreshed from a frame memory 48 as controlled by a user interface chip 50 which may process signals to and from the display interface 20 and/or additionally process user inputs from the keypad 22 and elsewhere.

Certain embodiments of the UE 10 may also include one or more secondary radios such as a wireless local area network radio WLAN 37 and a Bluetooth® radio 39, which may incorporate an antenna on the chip or be coupled to an antenna off the chip. Throughout the apparatus are various memories, on which the various programs 10C may be stored, such as random access memory RAM 43, read only memory ROM 45, and in certain embodiments of this invention, removable memory such as the illustrated memory card 47. All of these components within the UE 10 are normally powered by a portable power supply such as a battery 49.

The processors 38, 40, 42, 44, 46, 50, if embodied as separate entities in a UE 10 or eNB 12, may operate in a slave relationship to the main processor 10A, 12A, which may then be in a master relationship to them. Embodiments of this invention may be disposed across various chips and memories as shown, or disposed within another processor that combines some of the functions described above for FIG. 2B. Any or all of these various processors of FIG. 2B access one or more of the various memories, which may be on-chip with the processor or separate there from. Similar function-specific components that are directed toward communications over a network broader than a piconet (e.g., components 36, 38, 40, 42-45 and 47) may also be disposed in exemplary embodiments of the access node 12, which may have an array of tower mounted antennas rather than the two shown at FIG. 2B.

Note that the various integrated circuits (e.g., chips 38, 40, 42, etc.) that were described above may be combined into a fewer number than described and, in a most compact case, may all be embodied physically within a single chip.

Regarding the first aspect of the invention, in view of the various considerations related to Equations (1) and (2) above, described now is a generalized PUSCH power control formula for use in, for example, LTE-A:

$$P'_k = 10 \cdot \log_{10} M[k] + P_{0\_PUSCH}[k] + \alpha[k] \cdot PL[k] + \Delta_{MCS} + f(\Delta_i[k]) \quad (4)$$

$$\text{if } \left( \sum_{j=1}^{K} 10^{P'_k/10} \right) \leq 10^{P_{max}/10}$$

$$P_k = P'_k$$

else $$P_{offset} = 10 \cdot \log_{10}\left(\sum_{j=1}^{K} 10^{P_k/10}\right) - P_{MAX}$$

$$P_k = 10 \cdot \log_{10} M[k] + P_{0\_PUSCH}[k] + \alpha[k] \cdot PL[k] + \Delta_{MCS} + f(\Delta_i[k]) - P_{offset}.$$

In essence, Equation (4) corresponds to setting the PUSCH transmission power independently on each component carrier based on the CC-specific PC parameters and measurements. If the UE 10 maximum total transmission power is exceeded, then the PUSCH transmission power on each component carrier is decreased by the same relative amount ($P_{offset}$) in decibels. Hence, the power control formula in Equation (4) explicitly includes a mechanism for reducing the power per CC to ensure at all times that the total power is below the UE 10 maximum transmit power.

The power control formula of Equation (4) may be further extended to also consider switching off the transmission of some of the component carriers if the following condition is true:

$$\text{if } \left( \sum_{j=1}^{K} 10^{P'_k/10} \right) \leq 10^{P_{MAX}/10}. \quad (5)$$

Hence, if the sum of the desired transmission powers on the individual component carriers exceeds the maximum, then it is possible to switch off one or more of the component carriers to further reduce the transmitted power.

Whether the UE 10 strictly follows the procedure embodied in Equation (4) by reducing the power of each component carrier, or switches off the transmission of some of the component carriers may, as an example, be based on the following criteria:

(a) If the transmission power (or power spectral density) on one of the component carriers is below a certain threshold, then switch off the corresponding component carrier rather than reducing the power of all component carriers. The threshold may be fixed in the relevant LTE-A specification(s), and thus known a priori by the UE 10, or it may be signaled from the eNB 12 via higher layer signaling.

(b) Those component carriers with HARQ retransmission should never be switched off.

(c) If the value of $P_{offset}$ in Equation (4) is larger than a certain threshold, then instead switch off transmission of the component carrier having the smallest transport block size, and re-calculate a new value of $P_{offset}$. The threshold may be fixed in the relevant LTE-A specification(s), and thus known a priori by the UE 10, or it may be signaled from the eNB 12 via higher layer signaling.

(d) If the maximum UE power is exceeded in the first step, then begin decreasing the power of those component carriers with retransmissions before decreasing the power of component carriers with first transmissions. This is possible because retransmissions typically require less power per bit than first transmissions. That is, for HARQ retransmissions, the receiver (at the eNB 12 in the UL case) combines the energy from all previous transmissions, and thus the system may typically tolerate the use of a lower power for a retransmission, without experiencing performance degradation.

The power decrease on those component carriers with pending retransmissions may be applied down to a minimum power (or power spectral density) level, which may be either absolute or relative to the value fixed by the power control formula in Equation (4). The minimum level may be fixed in the relevant LTE-A specification(s), and thus known a priori by the UE 10, or it may be signaled from the eNB 12 via higher layer signaling.

Note that the foregoing several criteria are not limiting in any respect, and other criteria and triggers may be used for determining if one or more component carriers may be switched off.

As was made apparent above, CC-specific power control implies that the UE 10 can transmit using different transmission powers and/or power spectral densities on separate component carriers. A further consideration as to how to generalize the power control formula for multiple CCs depends on whether a single or multiple power amplifiers (PA) are used at the UE 10.

For a case of one PA for all CCs, if the total UE 10 transmission power on all CCs exceeds the maximum UE power capabilities, the UE 10 should determine how to reduce the Tx power for the CC(s), and determine the power reduction in correspondence of each selected CC.

For example, the PUSCH transmission power may be decreased by the same relative power offset on each active component carrier. In this case the maximum UE 10 transmission power may equally "distributed" among the PAs.

Moreover, from a UE-implementation point of view, it may become problematic for the UE 10 to operate with arbitrarily high transmit power differences between different CCs for the case of a single PA. Therefore, a mechanism may be desirable to establish the maximum power difference between component carriers to be less than, or equal to, some certain value. As was noted above, different standardized mechanisms may be considered, such as a standardized rule to be implemented in the UE 10, or an explicitly signaled power offset by the eNB 12.

In summary, and assuming as a baseline condition that UL power control in LTE-Advanced is based on the UL power control approach defined in LTE Rel-8, in the case of non-contiguous channel aggregation the propagation conditions can potentially be quite different in different component carriers. Because of this component carrier specific uplink power control is preferred for use. The following issues are thus considered: define CC-specific power control parameters, and possibly use CC-specific closed loop PC commands; and operation in the case of a single power amplifier per UE 10, or CC-specific power amplifiers.

It should be possible to perform RSRP measurements only on a single component carrier and then derive the path loss of the other component carriers based on this measurement, especially in the case when there are more uplink component carriers than downlink component carriers.

Based on the foregoing it should be apparent that the exemplary embodiments of the first aspect of this invention provide a method, apparatus and computer program(s) to provide enhanced UL power control for a case where there are multiple component carriers so as not to exceed a UE-specific maximum transmission power.

Figure 3:
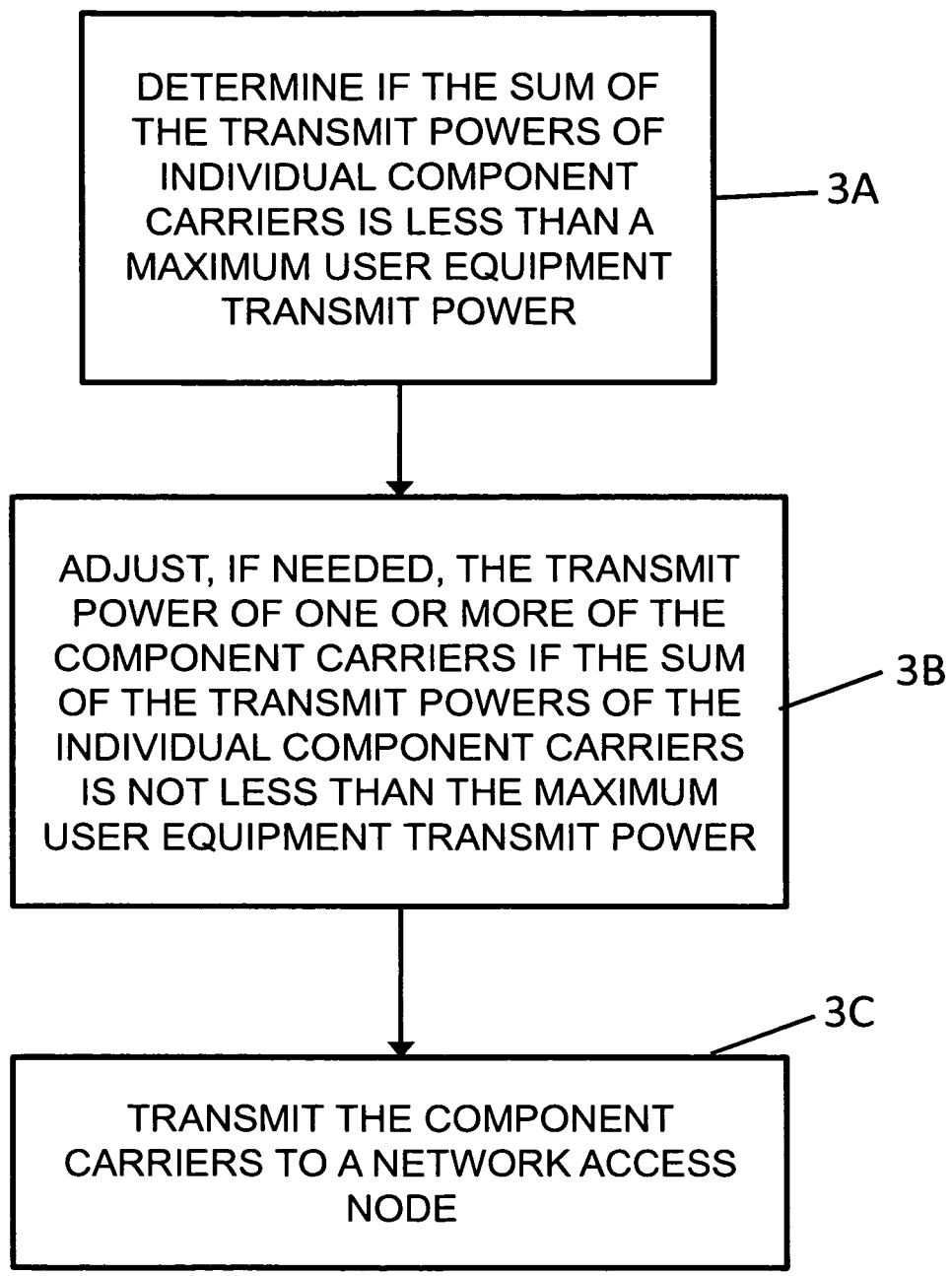
FIG. 3 is a logic flow diagram that illustrates the operation of a method, and a result of execution of computer program instructions embodied on a computer readable memory, in accordance with certain exemplary embodiments of this invention.

(A) FIG. 3 is a logic flow diagram that illustrates the operation of a method, and a result of execution of computer program instructions, in accordance with the exemplary embodiments of the first aspect of this invention. In accordance with these exemplary embodiments, a method performs, at Block 3A, a step of determining if the sum of the transmit powers of individual component carriers is less than a maximum user equipment transmit power, at Block 3B a step of adjusting, if needed, the transmit power of one or more of the component carriers if the sum of the transmit powers of the individual component carriers is not less than the maximum user equipment transmit power, and Block 3C, a step of transmitting the component carriers to a network access node. It is assumed that the component carriers being summed and adjusted are active, e.g., are scheduled.

(B) The method as in the preceding paragraph (A), where the steps of ensuring and adjusting comprise calculating a sum-power over all component carriers, and decreasing the power of each component carrier by a same relative amount.

(C) The method as in the paragraph (A), where the steps of ensuring and adjusting comprise calculating a sum-power over all component carriers, and selectively reducing the power of at least one component carrier. It should be noted that this could include the case where the power is reduced on a plurality of component carriers but with a different relative power reduction on different component carriers.

(D) The method as in the preceding paragraph (C), where the at least one component carrier is one used for a retransmission.

(E) The method as in the paragraph (A), where the steps of ensuring and adjusting comprise calculating a sum-power over all component carriers, and selectively not transmitting at least one component carrier.

(F) The method as in the paragraph (E), where a component carrier that is selectively not transmitted is one having a transmission power or power spectral density below a threshold value defined by specification or by the network access node.

(G) The method as in the paragraph (E), where a component carrier that is selectively not transmitted is one that is not used for a retransmission.

(H) The method as in the paragraph (E), where a component carrier that is selectively not transmitted is one having a transport block size below a threshold value defined by specification or by the network access node.

(I) The method as in any one of the preceding paragraphs, where the step of transmitting transmits to a physical uplink shared channel.

The exemplary embodiments of the first aspect of this invention also encompass an apparatus that includes a controller, coupled with a transmitter, that is configured to determine if the sum of transmit powers of individual component carriers is less than a maximum user equipment transmit power and, if needed, to adjust the transmit power of one or more of the component carriers if the sum of the transmit powers of the individual component carriers is not less than the maximum user equipment transmit power. The controller is further configured to transmit the component carriers to a network access node using the transmitter.

The exemplary embodiments of the first aspect of this invention also encompass an apparatus that includes means for determining if the sum of the transmit powers of individual component carriers is less than a maximum user equipment transmit power, means for adjusting, if needed, the transmit power of one or more of the component carriers if the sum of the transmit powers of the individual component carriers is not less than the maximum user equipment transmit power, and means for transmitting the component carriers to a network access node.

The exemplary embodiments of the first aspect of this invention also encompass a computer program product comprising a computer-readable medium bearing computer program code embodied therein for use with a computer, the computer program code comprising: code for determining if a sum of the transmit powers of individual component carriers is less than a maximum user equipment transmit power; code for adjusting, if needed, the transmit power of one or more of the component carriers if the sum of the transmit powers of the individual component carriers is not less than the maximum user equipment transmit power; and code for causing the component carriers to be transmitted to a network access node.

Figure 4:
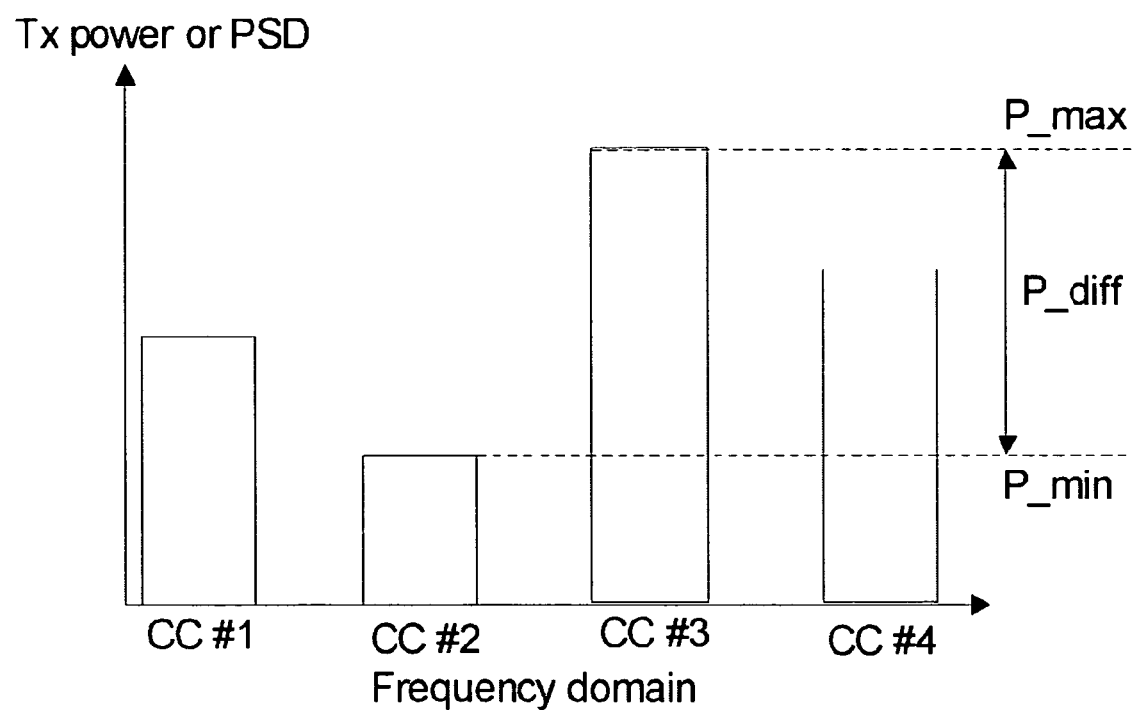
FIG. 4 graphically depicts a non-limiting example of transmit powers on four different component carriers, and is useful for gaining an understanding of the exemplary embodiments of this invention.

Regarding the second aspect of the invention, reference is made to FIG. 4 for showing exemplary UE 10 transmit power on different CCs. While four CCs are shown in FIG. 4, the exemplary embodiments may be used with any number of CCs greater than two.

Figure 5:
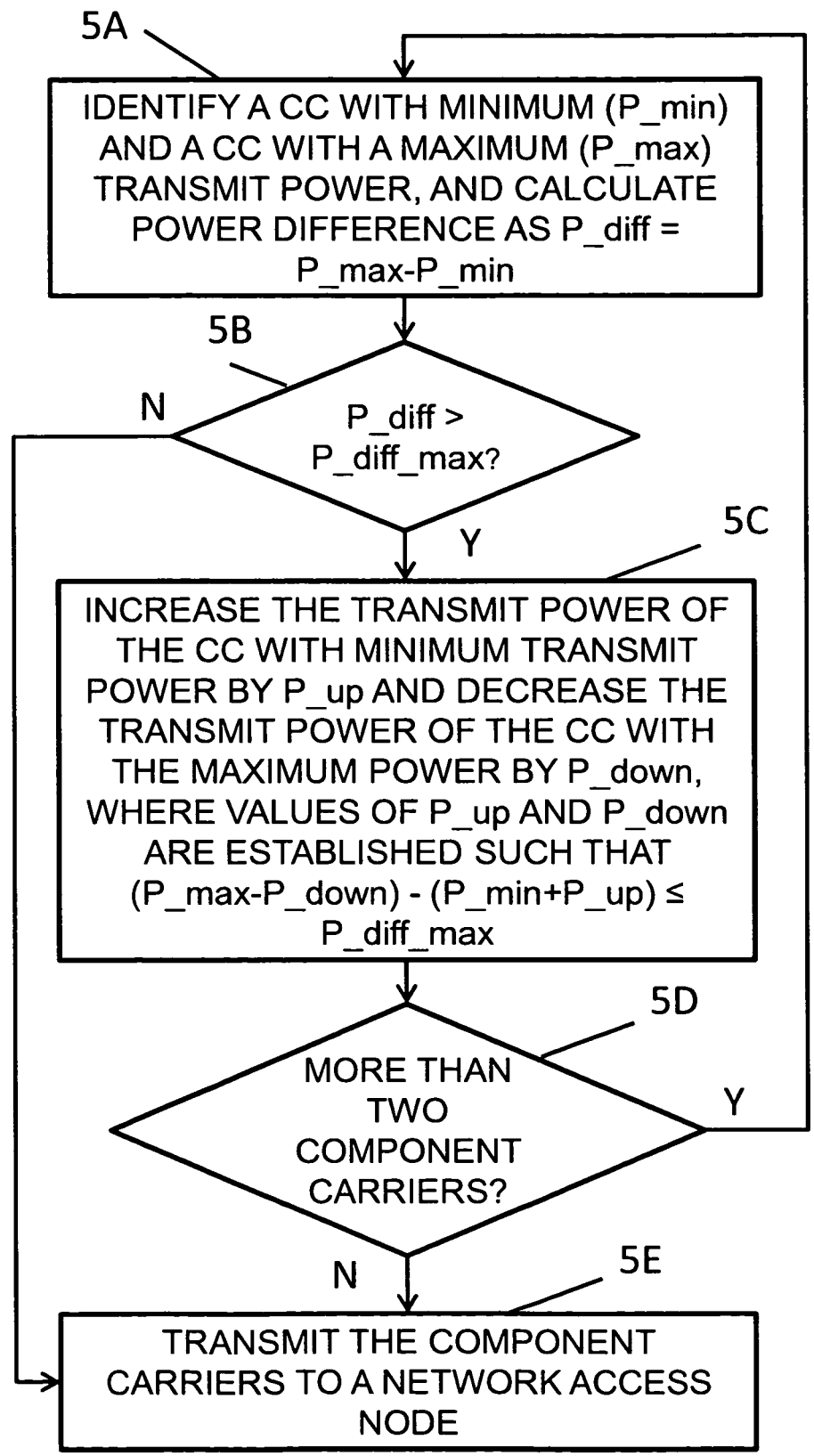
FIG. 5 is a logic flow diagram that illustrates the operation of a method, and a result of execution of computer program instructions embodied on a computer readable memory, in accordance with certain exemplary embodiments of this invention.

Referring also to the logic flow diagram of FIG. 5, at Block 5A the UE 10, e.g., the PC function 10E, identifies a CC with minimum (P_min) and a CC with a maximum (P_max) transmit power. Based on the associated transmit power values a power difference is calculated as $P\_diff = P\_max - P\_min$ (note that all expressions are in decibels).

At Block 5B a determination is made if P_diff>P_diff_max. If it is, then control passes to Block 5C where the transmit power of the CC with minimum transmit power is increased by P_up and the transmit power of the CC with the maximum power is decreased by P_down (P_up and P_down are also expressed in dB). The values of P_up and P_down are established such that (P_max−P_down)−(P_min+P_up)≦P_diff_max. In addition, it is desirable that the total UE 10 Tx power remains about the same (at least the total UE 10 TX power should not increase). As a non-limiting example, there are at least two methods for calculating the values of P_up and P_down.

In a first method the values of P_up and P_down may be calculated such that the transmit power of the maximum transmit power CC and the minimum transmit power CC are adjusted by the same relative ratio, so that if expressed in decibels P_up=P_down=(P_max−P_min)/2 [dB]. Note that in this example the total UE 10 transmission power is not maintained constant (i.e., it actually decreases).

In a second method the values of P_up and P_down may be calculated such that the transmit power of the maximum transmit power CC and the minimum transmit power CC are adjusted by the same absolute power. In this case the increase/decrease in absolute power (P) may be calculated as $[10^{P\_max/10}-k*10^{P\_min/10}]/(k+1)$, where $k=10^{P\_diff\_max/10}$. The Tx power on the max and min CC are then derived as $10*\log_{10}[10^{Pmax/10}-P]$ and $10*\log_{10}[10^{Pmin/10}+P]$, respectively. Note that in this example the total UE 10 transmission power remains constant.

At Block 5D a determination is made if there are more than two component carriers. If there are, then control passes back to Block 5A, and the method is repeated until P_max−P_min≦P_diff_max. These adjustments ensure that the maximum power difference between CCs is always less than, or equal to, P_diff_max. At Block 5E, the component carriers are transmitted to a network access node, such as eNB 12. It is noted that Block 5D is related to active carrier, that is, the carriers that are scheduled.

The various blocks shown in FIGS. 3 and 5 may be viewed as method steps, and/or as operations that result from operation of computer program code, and/or as a plurality of coupled logic circuit elements constructed to carry out the associated function(s), such as logic circuits/program code that embody the PC function 10E shown in FIG. 2A.

It should be noted that the exemplary embodiments described above for the second aspect of the invention may be used to control the maximum transmit power difference between the CCs, or to control the maximum PSD between the CCs. Note further that the transmit power per CC also depends on the number of scheduled PRBs per CC, while this is not the case the for the PSD. The PSD per CC is equal to the expression in Equation 2 above for M[k]=1. In general, the PSD refers to the power per Hz, or the power per PRB. For example, given a transmission from a user (e.g., denoted by $P_{ue}$) and the number of scheduled PRBs (e.g., N PRBs), then the PSD equals $P_{ue}/N$.

It is further within the scope of these exemplary embodiments of the invention to extend the uplink power control procedure to also have maximum and minimum transmit power values for individual CCs.

Based on the foregoing it should be apparent that the exemplary embodiments of the second aspect of this invention provide a method, apparatus and computer program(s) to provide enhanced UL power control for a case where there are multiple component carriers so as not to exceed a UE-specific maximum transmission power.

(A) The operation of a method, and a result of execution of computer program instructions, in accordance with the exemplary embodiments of the second aspect of this invention provide steps and operations that comprise identifying a CC with minimum (P_min) and a CC with a maximum (P_max) transmit power; calculating a power difference as P_diff=P_max−P_min; determining if P_diff>P_diff_max and, if it is, increasing the transmit power of the CC with minimum transmit power by P_up and decreasing the transmit power of the CC with the maximum power by P_down; and if there are more than two CCs repeating until P_max−P_min≦P_diff_max such that the maximum power difference between CCs is constrained to be less than or equal to P_diff_max.

(B) The method as in paragraph (A), where values of P_up and P_down are established such that (P_max−P_down)−(P_min+P_up)≦P_diff_max, where a total transmit power is not increased during execution of the method.

(C) The method as in any one of the preceding paragraphs, where values of P_up and P_down are determined such that the transmit power of the maximum transmit power CC and the minimum transmit power CC are adjusted by the same relative ratio where, if expressed in decibels, P_up=P_down=(P_max−P_min)/2 [dB].

(D) The method as in any one of paragraphs A and B, where values of P_up and P_down are determined such that the transmit power of the maximum transmit power CC and the minimum transmit power CC are adjusted by the same absolute power, where the increase/decrease in absolute power (P) is determined as $[10^{P\_max/10}-k*10^{P\_min/10}]/(k+1)$, where $k=10^{P\_diff\_max/10}$, and where the Tx power of the maximum and the minimum CC are derived as $10*\log_{10}[10^{Pmax/10}-P]$ and $10*\log_{10}[10^{Pmin/10}+P]$, respectively.

(E) The method as in any one of the preceding paragraphs, used to control the maximum power spectral density between the CCs.

(F) The method as in any one of the preceding paragraphs, further comprising transmitting the CCs to a physical uplink shared channel.

The exemplary embodiments of the second aspect of this invention also encompass an apparatus that includes a controller, coupled with a transmitter, that is configured to identify a CC with minimum (P_min) and a CC with a maximum (P_max) transmit power and to calculate a power difference as P_diff=P_max−P_min. The controller is also configured to determine if P_diff>P_diff_max and, if it is, to increase the transmit power of the CC with minimum transmit power by P_up and to decrease the transmit power of the CC with the maximum power by P_down. The controller is further configured, if there are more than two active CCs, to repeat these operations until P_max−P_min≦P_diff_max such that the maximum power difference between CCs is constrained to be less than or equal to P_diff_max.

The exemplary embodiments of the second aspect of this invention also encompass an apparatus that includes means for identifying a CC with minimum (P_min) and a CC with a maximum (P_max) transmit power; means for calculating a power difference as P_diff=P_max−P_min and for determining if P_diff>P_diff_max and, if it is, for increasing the transmit power of the CC with minimum transmit power by P_up and decreasing the transmit power of the CC with the maximum power by P_down. The apparatus operates, if there are more than two active CCs, for repeating until P_max−P_min≦P_diff_max such that the maximum power difference between CCs is constrained to be less than or equal to P_diff_max.

The exemplary embodiments of the second aspect of this invention also encompass a computer program product comprising a computer-readable medium bearing computer program code embodied therein for use with a computer, the computer program code comprising: code for identifying a component carrier with minimum transmit power and a component carrier with a maximum transmit power; code for calculating a power difference as a difference between the maximum transmit power and the minimum transmit power; code for determining if the power difference is greater than a maximum power difference and, if it is, increasing the transmit power of the component carrier with minimum transmit power by a first predetermined amount and decreasing the transmit power of the component carrier with the maximum power by a second predetermined amount; and code for if there are more than two active component carriers, repeating the identifying, calculating and determining until the power difference is less than the maximum power difference such that the maximum power difference between component carriers is constrained to be less than or equal to the maximum power difference.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the EUTRAN (UTRAN-LTE) system and the LTE-A system, it should be appreciated that the exemplary embodiments of this invention are not limited for use with only these particular types of wireless communication system, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters (e.g., P_max, P_min, P_diff, P_up, P_down) are not intended to be limiting in any respect, as these parameters may be identified by any suitable names. Further, various formulas and expressions, such as those found in Equations (1) through (4) and those shown in FIG. 5 and otherwise discussed above, that may use these various parameters may differ from those expressly disclosed herein. Further, the various names assigned to different channels (e.g., PUSCH) are not intended to be limiting in any respect, as these various channels may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
   determining if a sum of transmit powers of individual component carriers of a plurality of component carriers is less than a maximum user equipment transmit power;
   adjusting, if needed, the transmit power of one or more of the plurality of component carriers if the sum of the transmit powers of the individual component carriers is not less than the maximum user equipment transmit power, wherein the adjusting comprises selectively decreasing the transmit power of at least one but not all of the plurality of component carriers; and
   transmitting the component carriers to a network access node.

2. A method as in claim 1, where adjusting further comprises decreasing the transmit power of each of the plurality of component carriers by a same relative amount.

3. A method as in claim 1, where the at least one component carrier is one used for a retransmission.

4. A method as in claim 1, where adjusting further comprises selectively not transmitting at least one but not all of the plurality of component carriers.

5. A method as in claim 1, where transmitting transmits to a physical uplink shared channel.

6. A computer program product comprising a computer-readable storage medium bearing computer program code embodied therein for use with a computer, the computer program code comprising code for performing the method of claim 1.

7. A method, comprising:
   identifying a component carrier with a minimum transmit power and a component carrier with a maximum transmit power;
   calculating a power difference as a difference between the maximum transmit power and the minimum transmit power;
   determining if the power difference is greater than a predetermined maximum power difference and, if it is, increasing the transmit power of the component carrier with minimum transmit power by a first predetermined amount and decreasing the transmit power of the component carrier with the maximum transmit power by a second predetermined amount; and if there are more than two component carriers, repeating the identifying, calculating and determining until the power difference is less than the predetermined maximum power difference such that the maximum power difference between component carriers is constrained to be less than or equal to the predetermined maximum power difference.

8. A method as in claim 7, where values of first predetermined amount and second predetermined amount are established such that (maximum transmit power minus second predetermined amount) minus (minimum transmit power plus first predetermined amount) is less than or equal to the predetermined maximum power difference, where a total transmit power is not increased.

9. A method as in claim 7, where values of the first predetermined amount and the second predetermined amount are determined such that the transmit power of the maximum transmit power component carrier and the minimum transmit power component carrier are adjusted by a same relative ratio, if expressed in decibels: the first predetermined amount is equal to the second predetermined amount, which is equal to (maximum transmit power minus minimum transmit power) divided by two.

10. A method as in claim 7, where values of first predetermined amount and second predetermined amount are determined such that the transmit power of the maximum transmit power (P_max) component carrier and the minimum transmit power (P_min) component carrier are adjusted by a same absolute power, where a change in absolute power (P) is determined as $[10^{P\_max/10} - k*10^{P\_min/10}]/(k+1)$, where $k=10^{P\_max\_diff/10}$, where P_max_diff is the predetermined maximum power difference, and where the transmit power of the maximum and the minimum component carriers are derived as $10*\log_{10}[10^{Pmax/10} - P]$ and $10*\log_{10}[10^{Pmin/10} P]$, respectively.

11. A method as in claim 7, used to control the maximum power spectral density between the component carriers.

12. A method claim 7, further comprising transmitting the component carriers to a physical uplink shared channel.

13. An apparatus comprising:
at least one processor; and
at least one memory including computer program code,
the at least one memory and the computer program code configured to, with the at least one processor, cause the apparatus to perform at least the following:
determining if a sum of transmit powers of individual component carriers of a plurality of component carriers is less than a maximum user equipment transmit power;
adjusting, if needed, the transmit power of one or more of the plurality of component carriers if the sum of the transmit powers of the individual component carriers is not less than the maximum user equipment transmit power, wherein the adjusting comprises selectively decreasing the transmit power of at least one but not all of the plurality of component carriers; and
transmitting the component carriers to a network access node.

14. An apparatus as in claim 13, where the at least one component carrier is one used for a retransmission.

15. An apparatus as in claim 13, where adjusting further comprises selectively not transmitting at least one but not all of the plurality of component carriers.

16. An apparatus as in claim 15, where selectively not transmitting at least one component carrier comprises one of the following:
not transmitting a component carrier that has a transmit power or power spectral density below a threshold value defined by specification or by the network access node;
not transmitting a component carrier that is not used for a retransmission; or
not transmitting a component carrier that has a transport block size below a threshold value defined by specification or by the network access node.

17. An apparatus as in claim 13, where transmitting transmits to a physical uplink shared channel.

* * * * *

UNITED STATES PATENT AND TRADEMARK OFFICE
CERTIFICATE OF CORRECTION

PATENT NO. : 8,447,345 B2  
APPLICATION NO. : 13/489870  
DATED : May 21, 2013  
INVENTOR(S) : Klaus I. Pedersen and Claudio Rosa Page 1 of 1

It is certified that error appears in the above-identified patent and that said Letters Patent is hereby corrected as shown below:

In the Claims

In Claim 10:

Column 17, line 37, "$[10^{Pmin/10}P]$" should be -- $[10^{Pmin/10}+P]$ --.

Signed and Sealed this  
Thirtieth Day of July, 2013

Teresa Stanek Rea  
*Acting Director of the United States Patent and Trademark Office*